Patented Nov. 27, 1951

2,576,566

UNITED STATES PATENT OFFICE 2,576,566

AGGLOMERATED BODY AND THE METHOD OF PREPARING SAME

Charles Raymond Brown, North Wales, Pa., assignor to G. and W. H. Corson, Inc., Plymouth Meeting, Pa., a corporation of Delaware No Drawing. Application August 16, 1948, Serial No. 44,594

11 Claims. (Cl. 106—50)

The present invention relates to novel agglomerated compositions; and more particularly to agglomerated bodies in which individual aggregate particles are bound together in a novel manner by a novel inorganic binding material. The term "agglomerated" is used herein to define a solid composition composed of many individual particles consolidated into a single coherent mass of the type used for forming ceramic shapes or bodies, briquets, pellets, nodules, and the like.

GENERAL PROBLEMS ENCOUNTERED IN PRIOR AGGLOMERATED BODIES

The problem of uniting particles of ordinarily non-cohesive, non-plastic material into agglomerated bodies is met throughout industry in many fields. In the binding together of particulate matter which is lacking in cohesiveness such as is practiced in the formation of certain ceramic shapes and bodies, the preparation of briquets, pellets, nodules, and the like, it is generally necessary to employ a binder with the composition so that the consolidated mass possesses sufficient strength for handling and other treatment. For instance, in the formation of refractory bricks and other ceramic shapes, briquets, pellets, nodules and other agglomerates, the compacted mass generally includes additions of inorganic materials such as bentonite, plastic clay, sodium silicate and the like or organic materials such as gum tragacanth, molasses, asphalt, resins, various lignin products, and the like, to serve as binders. The binding material serves to hold the compressed and compacted mass together while in the wet condition and further serves to hold the individual particles of the mass together after drying. In all such cases, binding in the wet agglomerated mass is caused by the adhesion of the more or less sticky binding material to each of the aggregate particles, and in the dried body by the fact that the binding agent hardens or crystallizes upon drying into a continuous phase or matrix which acts as an interlocking network holding the aggregate particles in place. However, with the use of all such binding materials in conventional agglomeration procedures, the wet agglomerated mass usually possesses insufficient "green strength" to be handled and otherwise used immediately. Thus costly and time-consuming drying or setting operations must often be resorted to before the agglomerated body can be used.

In practically all these applications, the body or article is ultimately subjected to a high temperature treatment. For example, ceramic bodies are subjected to a firing operation where vitrification takes place producing the final bond in the article. Briquets, nodules, and other agglomerates, on the other hand, are generally either converted to a molten state as is the case of, for example, ore briquets, or burned as is the case of fuel briquets. In any case, it is of the utmost importance that the agglomerated body retain its structural strength not only while wet or during and after drying, but also during the particular heating cycle to which it is to be subjected.

One of the main disadvantages of organic binders, aside from those mentioned above, where high temperature treatment is to be encountered, is the fact that they decompose at high temperatures, and thus disintegration of the agglomerate may result prior to the required degree of vitrification, melting or burning as the case may be. Moreover, organic binders are generally relatively expensive and since their function is temporary, merely serving to hold the mass together until its ultimate treatment or use, the use of such binding material represents an appreciable item of cost.

Inorganic binding materials, on the other hand, such as bentonite, sodium silicate and the like, while not destroyed at high temperatures as are organic materials, possesses, in addition to the expense involved in their use and those disadvantages referred to above, chemical and physical properties which often render their use as binders in the above-mentioned fields either troublesome or impossible. For example, sodium silicate acts as a very strong flux under high temperature treatment, which property prevents to a great extent its use as a binder in ceramic bodies. Moreover, both bentonite and sodium silicate are very hygroscopic. To prevent agglomerates bound by such hygroscopic binders from absorbing a deleterious amount of water, they are often subjected to a baking operation at temperatures ranging from 600° F. to 1000° F. Such a baking operation represents the expenditure of much time and money. In addition, both bentonite and sodium silicate are sensitive with respect to the amount of water to be incorporated with them when used as binders. For example, when bentonite is used as a binder a slight excess of water changes its consistency markedly and, therefore, deleteriously affects the properties of the product and presents a problem in its production. Thus, the hygroscopicity and water sensitivity of these materials necessitate expensive storage, handling, and proportioning equipment.

THE OBJECTS OF THE INVENTION

It is, therefore, a principal object of the present invention to provide agglomerated bodies wherein the individual particles are bound in a novel manner by a novel binding material and with which the above-mentioned difficulties are not encountered.

Another object is to provide agglomerated bodies in which the individual particles are bound in a matrix comprising a cheap and abundant natural material.

Another object is to provide agglomerated bodies of high structural strength and cohesion comprising non-cohesive, non-plastic type of particulate material, which can be readily handled and stored without the necessity of drying or high temperature baking operations.

Still another object is to provide agglomerated bodies of the type that are to be subjected to high temperature operations such as vitrification, fusion, and the like, in which the individual particles are bound in a matrix comprising binding material that retains its binding strength at high temperatures and serves as a mild and easily controllable flux.

Still another object is to provide agglomerated bodies in which the individual particles are bound in a matrix comprising a readily available natural material which possesses unusually high cohesion properties toward aggregate particles.

A further object is to provide agglomerated bodies in which the individual particles are bound in a matrix comprising cheap and abundant natural material which is not hygroscopic and is easily handled even in bulk form.

Other objects, including a novel process of agglomerating materials, will be apparent from a consideration of the following specification and the claims.

GENERAL STATEMENT OF PRODUCT

In accordance with the present invention, there are provided agglomerated bodies in which the individual particles of aggregate material are bound in a matrix comprising glauconite. The product of the invention thus comprises, in intimate admixture, a discontinuous or dispersed phase comprising individual particles of non-plastic, non-cohesive aggregate material in relatively small particle size representing the material sought to be agglomerated into a coherent mass, smeared or coated with a novel continuous binding phase or matrix comprising glauconite which possesses unusual cohesion properties within itself and between itself and normally non-cohesive aggregate particles.

DESCRIPTION OF GLAUCONITE

Glauconite is a mineralogical hydrous silicate of iron and potassium, containing smaller and varying amounts of alumina, magnesia and lime, and often minor amounts of other compounds. It is found in numerous geological structures, although it is most readily available in sedimentary beds near the shores of major oceans. One of the most abundant sources of glauconite is the greensand beds of New Jersey, the most readily obtainable varieties of which are the Navesink, Hornerstown, and Manasquan varieties.

Glauconite is usually found as a greenish sand-like or granular amorphous material, the grain size of the bulk of which ranges from 100 mesh up through 20 mesh. The larger grains appear oölitic in structure whereas the fine grain material appears as pellet-like particles. Chemically, glauconite generally contains: $SiO_2$, 49–52%; $FeO$, 2–6%; $Fe_2O_3$, 16–22%; $Al_2O_3$, 3–9%; $CaO$, trace–7%; $MgO$, trace–4%; $K_2O$, 3–8%; $Na_2O$, 0–2%; $P_2O_5$, 0–3%; combined $H_2O$, 5–10%; a typical analysis of New Jersey greensand being as follows: $SiO_2$, 49.65%; $FeO$, 2.94%; $Fe_2O_3$, 18.58%; $Al_2O_3$, 3.62%; $CaO$, 6.54%; $MgO$, 2.93%; $K_2O$, 3.87%; $P_2O_5$, 1.84%; combined $H_2O$, 9.08%; the balance being minor impurities.

THE BINDING PHASE OF GLAUCONITE

As stated, the binding material present in the products of the present invention comprises glauconite which has been smeared or coated on the individual aggregate particles, and which thus forms a continuous binding phase or matrix. Glauconite exists in nature as relatively friable particles which when subjected to a rubbing, shearing, or other disintegrating action releases extremely fine particles which readily smear or coat adjacent surfaces. Thus when glauconite is subjected to such rubbing or shearing action in the presence of aggregate particles, the aggregate particles become smeared with this fine material. As will be more fully discussed hereinafter, this coating of smeared glauconite possesses unusual natural cohesion with aggregate particles, and thus when the smeared aggregate particles are consolidated they cohere into a dense, hard agglomerated body. An examination of such agglomerated bodies shows that the body throughout possesses the characteristic greenish coloration of glauconite, indicating that extremely fine particles of glauconite are thoroughly dispersed therein, coating the individual aggregate particles and forming a continuous binding phase of unusually high natural cohesion. Although the exact reasons for this unusual binding power of glauconite are not fully understood, the following discussion sets forth certain characteristics of glauconite which, it is believed, contribute to the binding properties of that material.

It has been found that glauconite can be mechanically reduced to three distinct phases as determined by their rate of settling in water. One of these phases consists of quick settling, coarse-grained particles low in silica. Another consists of slower settling, finer particles possessing a higher silica content. The third phase, which is also high in silica content, consists of extremely fine colloidal particles of sub-micron particle size which when mixed with water forms a gel-like structure which settles at an extremely slow rate. The colloidal particles of this gel-like mass are hydrophilic and hold appreciable amounts of water as an immobile layer or lyosphere, enveloping the particle. For the purposes of the present invention, the first two quickly settling phases may be considered as one, and will be referred to herein as the "particulate phase" of the glauconite, while the extremely fine phase will be referred to as the "colloidal phase" of the glauconite. It is believed that, when glauconite is subjected to a mechanical rubbing or shearing action as more fully discussed hereinafter, the colloidal and particulate phases are developed and individual aggregate particles become smeared or coated with these phases. Thus, it may be said that the colloidal phase and the particulate phase, in intimate admixture, form the continuous binding matrix in the product, and the combined colloidal and particulate phases will be referred to herein as the "binding phase"

of the glauconite. The particulate phase of the glauconite exists in the products of the present invention as relatively small particles being no greater in size than about 100 microns, with an average particle size of from about 5 to about 25 microns. The colloidal phase, as indicated, is of extremely fine sub-micron particle size. Based on the total weight of the smearable glauconite binding phase, the colloidal phase is generally present in an amount between about 5% and about 25%, the remainder being present as the particulate phase. It will be understood that in the products there may also be particles of glauconite having sizes larger than 100 microns, the exact proportion of which depends upon the extent the glauconite is mechanically reduced during the mixing or other operations. Any glauconite particles having a particle size greater than 100 microns that are present in the product are considered as aggregate particles and as part of the discontinuous or dispersed aggregate phase.

DEVELOPMENT OF THE BINDING PHASE OF GLAUCONITE

The above-defined glauconite binding phase may be developed in a wide variety of ways. The friability, or ability to be reduced to the several phases, of the glauconite varies depending upon its source, the method employed in mining it, previous handling, whether it has been subjected to the action of water, and the like. In any event, a mechanical rubbing, shearing, or other disintegrating action may be resorted to, the intensity of which will depend upon the friability of the glauconite employed. For example, in some instances, the glauconite may be of such friability that the rubbing action encountered when it is intimately mixed with the aggregate to be agglomerated, is sufficient to provide the required amount of binding phase. On the other hand, other glauconite may require more intense rubbing, shearing, or other disintegrating action such as is obtained by the use of various crushing, grinding, or pulverizing mills as more fully discussed hereinafter. The intensity of the rubbing or shearing action also depends upon the proportion of glauconite it is desired to have present in the body as binding phase, and as a general proposition it may be stated that the more intense and/or the longer the disintegration action, the greater the proportion of glauconite that is converted to the smearable binding phase.

MATERIALS THAT MAY BE AGGLOMERATED USING GLAUCONITE AS BINDER

In the products of the present invention, the particles of aggregate material that are sought to be agglomerated are coated or smeared with the fine glauconite binding phase above-referred to. Obviously, there is a wide variety of materials that may be agglomerated in accordance with the present invention, depending upon the use to be made of the product, and herein all such particles will be referred to as "aggregate particles." In the preparation of ceramic bodies, for example, the discontinuous aggregate phase may comprise normal ceramic producing materials such as shale; grog such as, for example, crushed fire brick; refractory grains such as mullite, alundum; and the like. For instance, in copending application of Charles Raymond Brown, Serial No. 739,357, filed April 4, 1947, there is disclosed and claimed a novel ceramic product prepared from fly ash and coal-ash slag and its method of preparation. In the preparation of such articles, a dry-strength-increasing material may be included which acts as a preliminary binding material to increase the strength of the shaped article prior to vitrification. It has been found that glauconite serves as an excellent dry-strength-increasing material in such articles, and thus, the products of the present invention include such unvitrified agglomerated bodies comprising glauconite and an aggregate phase comprising fly ash and coal-ash slag. Moreover, in agglomerates, such as briquets, pellets, nodules, and the like, that are used for the purpose of charging raw material to the cupola or furnace in metallurgical and other operations, there are many different types of materials included. For example, metallurgical briquets comprising agglomerated ores, either natural ores such as iron ore, or waste residues such as the iron oxide residue formed in the processing of pyrites, and the like may be provided in accordance with the present invention. Similarly, metallurgical and other briquets containing fuel may be prepared containing coal, coke, coal refuse, and the like. Moreover, in operations where the increase in ash imparted by the glauconite is not objectionable, fuel briquets wherein the aggregate particles are chiefly a solid fuel such as coal, coke, coal refuse, and the like, may be prepared.

As disclosed and claimed in application of Leonard John Minnick, Serial No. 44,580, filed August 16, 1948, glauconite is a valuable cupola charge ingredient in the manufacture of mineral wool. Preferably, the glauconite is added to the cupola in the form of agglomerated bodies such as, for example, briquets, advantageously containing various other finely divided charge ingredients along with the glauconite. Such other cupola charge ingredients are, for example, silica-containing materials such as silica sand, siliceous limestones, dolomite high in silica, sandstone, crushed glass, and the like; various slags such as iron blast furnace slag, copper and lead furnace slags and the like; lime-bearing materials such as limestone, dolomite, lime-bearing slags, various calcareous rocks, and the like; various fluxing ingredients such as roll or mill scale and the like; fuels such as coal, coal refuse, coke; and the like. Advantageously, as disclosed in said copending application, there is included in the glauconite-bound agglomerates to be fed to the cupola, certain waste materials encountered throughout the mineral wool industry such as waste wool and "shot." Shot consists of tiny glass-like beads or pellets produced when droplets of molten charge material are incompletely fiberized. In the mineral wool industry, the proportion of shot formed may run as high as 30% or 40% and thus the re-use of this material as well as of waste wool as charge ingredients represents a considerable saving. Glauconite-bound agglomerates comprising mineral wool-forming materials selected from those above mentioned are particularly valuable products and represent preferred products of the present invention.

From the above illustrative cases, it can be seen that the chemical nature of the aggregate agglomerated into the products of the invention varies widely depending upon the use intended for the article. However, since in cases where it is sought to agglomerate particles by means of an added binding material, the particles themselves generally possess substantially no cohesion among themselves under low temperature conditions, the individual aggregate particles in the products of the present invention, other than the glauconite, are generally of such non-cohesive nature. In addition, they are of relatively small size varying from 0.5 inch in size down to sub-micron fineness. However, usually none of the aggregate particles will be greater than about 0.25 inch in size, and at least a major portion will be finer than about 0.1 inch.

There may also be included in the agglomerated products of the invention, certain additive materials that are normally included in agglomerates for various purposes. For example, various fillers, coloring materials, fluxes, and the like may be included to impart whatever effect is desired. Small quantities of other materials which also exert a binding effect in the agglomerated product such as, for example, plastic clay, bentonite, sodium silicate, asphalt, resins, lignin products, and the like, may also be incorporated in the product if for any reason such addition is desired, although it is understood that the major part of the binding effect in the product is due to the presence of the glauconite.

PROPORTIONS OF GLAUCONITE IN THE PRODUCT

The amount of glauconite required in the products of the invention varies widely depending upon the proportion thereof existing as the smearable binding phase, and upon the particle size distribution of aggregate materials employed. In any case, the amount employed will be sufficient to coat aggregate particles in the mixture such that upon the application of slight pressure the mixture will cohere into a firm structure. To put it another way the amount of glauconite employed will be sufficient to provide a continuous binding phase or matrix comprising the colloidal and particulate glauconite phases in the product. Generally, to provide satisfactory binding the glauconite binding phase is present in an amount of at least about 3% of the agglomerated body and preferably at least about 4%. The amount of binding phase present may be increased greatly above these figures, and the amount it may be increased will be determined by the use to be made of the product wherein its chemical composition and other characteristics are taken into consideration.

The particular method of forming the agglomerate and the size and shape desired in the aggregate may also be taken into consideration in determining the quantity of glauconite binding phase to be employed. For instance, where vacuum consolidation of the mixture is resorted to, such as in the de-airing of ceramic bodies, less binding phase may be required than in other methods since consolidation brought about by vacuum greatly enhances the strength of the mass. On the other hand, if relatively coarse aggregate particles are to be employed, it may be advisable to increase the proportion of binding phase in the product. In most cases, no more than about 50% of the product will be the glauconite binding phase referred to, although at times the binding phase may be increased to as high as 60% to 70%.

As indicated, a portion of the glauconite present in the agglomerated body may exist as particles larger than 100 microns. The proportion of the glauconite in the body that is present as the binding phase depends somewhat upon the glauconite content desired in the body. For example, where a large proportion of glauconite is permissible, only a relatively small fraction thereof need be present as the binding phase so long as sufficient binding phase is present to serve as the continuous binding matrix. On the other hand, where a small proportion of glauconite is permissible, a relatively large fraction thereof may be present as binding phase. Advantageously, at least 45%, and preferably 60% to 100% of the glauconite present in the body, will be present as the above defined binding phase.

Referring to the particularly valuable glauconite-bound agglomerated bodies adapted for charging mineral wool-forming materials to the cupola in accordance with the process claimed in application Serial No. 44,580, the proportions of glauconite binding phase therein may vary as indicated above. However, since it is preferred to incorporate other cupola charging ingredients in fine particle size in the agglomerate as well as to obtain the optimum benefits of the glauconite, such agglomerates will generally contain from about 8% to about 80%, and preferably from about 15% to about 35%, of glauconite, the remainder being selected from those mineral wool-forming materials as previously mentioned. The exact quantity of each specific mineral wool-forming material will be determined by taking into consideration the proportions of the basic chemical ingredients required to produce mineral wool. Mineral wool generally analyzes as follows: $SiO_2$ 30–50%, $Al_2O_3$ trace–20%, iron oxide (ferrous and ferric) trace–35%, CaO 10–45%, MgO trace–25%, with varying minor amounts of such materials as titanium, manganese, sulphur, sodium oxide, potassium oxide, and the like. Thus, the amounts of mineral wool-forming ingredients incorporated with the glauconite in the agglomerate will be selected to provide an overall chemical balance in the cupola charge within the above set forth ranges. It has been found that the above-mentioned chemical balance is readily met when the overall charge of mineral wool-forming ingredients comprises not greater than about 75%, of glauconite. When agglomerated bodies are prepared which are available to supply the entire charge of mineral wool-forming ingredients, the proportions of mineral wool-forming ingredients including glauconite in such agglomerates will be such as to provide an analyses within the above range of proportions and the glauconite will be present within the proportions set forth, namely between about 3% and about 75%, and preferably between about 8% and about 50%. On the other hand, it may be more desirable in certain cases to agglomerate only a portion of the more finely divided mineral wool-forming ingredients and to add such agglomerated bodies along with coarse pieces of other mineral wool-forming ingredients to the cupola to make up the entire charge. For instance, a highly economical agglomerate adapted for addition to the cupola along with coarse pieces of mineral wool-forming raw materials such as coarse slag, limestone, and the like, comprises shot and glauconite. For instance, a valuable agglomerate comprises between about 15% and about 35% glauconite, between about 15% and about 25% silica sand, and between about 45% and about 65% shot.

As stated, particularly valuable agglomerated bodies which can be converted into ceramic articles by vitrification can be prepared in which fly-ash and coal-ash slag are bound by glauconite. In such bodies, the amount of coal-ash slag articles may vary from about 5% to about 80% based on the combined weight of the fly ash and coal-ash slag. The amount of glauconite binding phase present in such bodies will vary depending largely upon the proportion of fly ash therein. In general, the amount of glauconite binding phase increases as the proportion of fly ash decreases, for example, in some cases 20% or more of glauconite binding phase may be required. On the other hand, as indicated, as low as about 3% of glauconite binding phase may be sufficient so long as a moldable mass is provided. Preferably in such agglomerated bodies, the coal-ash slag is present in an amount between about 35% and about 65% based on the combined weight of fly ash and coal-ash slag, in which case the glauconite binding phase is generally present in an amount between about 5% and about 15%.

PREPARATION OF THE GLAUCONITE-BOUND AGGLOMERATED PRODUCT

In preparing the agglomerated products of the present invention, the aggregate particles of material to be agglomerated are intimately mixed with glauconite to disperse the aggregate particles thoroughly in the glauconite, to coat aggregate particles with the smearable glauconite binding phase, and to provide a uniform moldable mixture of the aggregate particles in a matrix of the glauconite binding phase above-referred to. The term "moldable" is used to describe the caking characteristics of the mixture if subjected to slight pressure as by squeezing with the hand. As indicated above, in some cases the required binding phase of the glauconite may be developed in the presence of the aggregate by merely mixing the ingredients together, for example, in a dough mixer or other mixing device. However, in most cases, it is advantageous to subject the glauconite to a more vigorous rubbing or shearing action between moving surfaces to develop the required binding phase, and, as stated, the longer the treatment and/or the more vigorous the treatment, the more complete will be the conversion of the glauconite to the binding phase. This may be accomplished in any machine where a rubbing or shearing action between moving surfaces is encountered such as in a pug mill, muller, rod mill, ball mill, Banbury mixer, and the like. While this operation may be performed on the glauconite separately prior to incorporating therewith the aggregate, and any other materials desired, the development of the binding phase by rubbing or shearing forces is preferably conducted in the presence of the aggregate and any other material it is desired to consolidate into the agglomerate mass. When glauconite is separately treated to develop the binding phase, this may be accomplished by the use of pulverizing and disintegrating equipment such as micropulverizers, fluidizing mills, and the like, as well as those machines mentioned above.

A small amount of water is advantageously present with the various ingredients during mixing. This water forms the gel-like material with the colloidal phase of the glauconite increasing its cohesive properties. The presence of water also facilitates the blending of the ingredients, and increases the plasticity of the mass. The amount of water present is relatively low, but the exact amount will depend in part upon the method employed in forming the agglomerated body. For example, if the body is to be formed by extrusion, more water will be required than if the agglomerated body is to be formed by compaction in, for example, a briquet press or by consolidation in a nodulizing machine. The amount of water present will also depend upon the type of other materials in the mixture. In any event, the amount of water is sufficient to form a moldable or formable mass, such that the mixture will form a coherent mass under slight pressure such as by squeezing with the hand. In most cases, there is sufficient free moisture already present in the glauconite to provide the desired moldable consistency, but in some operations water is incorporated with the ingredients during mixing. In most cases, the amount of water present in the mixture will be less than about 15% and more generally between about 5% and about 10%.

A particularly advantageous method of preparing a mixture that is readily compacted into hard dense agglomerates comprises mixing the glauconite and aggregate particles sought to be briquetted in a relatively dry condition, that is containing between about 5% and about 10% of moisture, in a muller or like machine. A minimum of about 9 horsepower hours is expended per ton of material during the mulling cycle. During the mulling, the visible character of the mass changes from a loose flowing mixture to a densified mass which cakes under pressure but does not stick to the hand. To the eye, it seems relatively dry, and to the touch somewhat grainy. This mass may then be compacted into tough, dense agglomerates, such as briquets of very high strength. Without further treatment, briquets made in this manner may be roughly handled and will withstand a drop of six feet upon a hard surface.

During mixing of the glauconite and the aggregate particles to be agglomerated, the binding phase of the glauconite, if it is not already present due to a previous disintegrating operation, is developed, and becomes smeared over the surfaces of individual particles forming the continuous binding phase of glauconite particles. Although the binding phase of the glauconite is not sticky, the particulate phase of the glauconite possesses a strong natural cohesion with the colloidal phase and the latter phase exhibits a strong adhesion with the aggregate particles sought to be bound. These effects are very pronounced and is believed to be caused by electrostatic or energy forces which couple the smeared glauconite with the various aggregate particles. That the binding phase of the glauconite possesses a remarkable natural cohesion with aggregate particles can be readily demonstrated by mixing slag particles with glauconite so that the binding phase smears and coats the slag surfaces. Once the slag particles have thus been coated, it is very difficult to wash the fine glauconite therefrom. These properties serve to unite the various ingredients into a coherent mass which when consolidated or compacted as described hereinafter, forms a firmly bound agglomerated structure.

The moldable mixture thus prepared may be formed into the desired type of agglomerated body by a wide variety of methods. For example, the mixture may be merely consolidated into lumps or nodules in a rotating agglomerating machine wherein the mixture is continuously tumbled until the mass is resolved into seperate lumps of no definite configuration. However, as is more often the case, the moldable mixture is formed into definite shapes by compacting under pressure. Formation under pressure by compacting or molding may take place in various types of machines. For example, ceramic bodies may be formed by extruding the mixture through a die by means of an extrusion auger, or in a dry press. Brick bodies, for instance, may be conveniently prepared by the use of de-airing brick machines. On the other hand, the mixture may be formed into agglomerated bodies such as briquets, pellets, and the like by the use of pellet machines, briquetting presses or rolls, and the like. The mixing and/or forming operations may be conducted in a continuous or batchwise manner as desired.

ADVANTAGEOUS CHARACTERISTICS OF GLAUCONITE - BOUND AGGLOMERATED PRODUCT

The products of the present invention are thus strong, dense agglomerates comprising the aggregate particles sought to be agglomerated firmly bound in a matrix comprising the extremely fine, smeared glauconite. One of the primary characteristics of the products is that they possess high "green strength," that is, upon formation, and without drying or baking operations, or other treatment, the "green" agglomerated bodies exhibit unusual structural strength due to the novel binding effect mentioned. Agglomerated bodies bound in this manner find wide application in many fields. For example, as a ceramic body containing the desired ceramic forming ingredients, it may be subjected to a firing cycle in a kiln or oven. On the other hand, if it is intended for use as a charge ingredient in a metallurgical operation or in the manufacture of mineral wool as described in said copending application Serial No. 44,580, it may be stored indefinitely, or charged immediately to the cupola as desired. In any case, the product after forming is available for immediate use. Due to the fact that the glauconite is not hygroscopic, the products bound thereby will not absorb a deleterious amount of moisture, and thus costly baking operations and/or storage facilities are not needed. Moreover, when the product is subjected to high temperatures, the binding phase does not disintegrate but in fact the cohesion properties become more pronounced so that the product remains intact until vitrification, complete fusion, or burning, as the case may be, takes place.

In many cases, the glauconite, besides functioning as an unusually strong but inexpensive binding material, serves as a valuable additive from a chemical standpoint. For example, the ferrous iron present in the glauconite acts as a mild flux at high temperatures, making it especially useful as an ingredient in ceramic bodies that are to be vitrified, and in metallurgical or other briquets that are to be melted. The fluxing power of the glauconite moreover, may be easily controlled to the degree desired. Since it is the ferrous iron that acts as the flux, oxidation of the iron to the ferric state to any degree prior to fusion lessens to a proportionate degree the fluxing power of the glauconite. Referring again to the fly ash-coal ash slag ceramic products of application Serial No. 739,357, it has been found that when glauconite is employed as the dry-strength-increasing agent in the preparation of the fly ash-coal ash slag body, a stronger, more firm product is produced at vitrification temperatures lower than normally required to produce a ceramic product. Moreover, because of the iron present in the glauconite, the vitrified product possesses improved color. Referring also to a copending application Serial No. 44,580, relating to the use of glauconite as a charge ingredient in the manufacture of mineral wool, it is pointed out therein that the presence of the glauconite as binder in the agglomerated bodies used as the charge greatly facilitates the melting of the various charge ingredients.

ADVANTAGES IN THE USE OF GLAUCONITE AS BINDER FOR AGGLOMERATED PRODUCT

The use of glauconite as a binding material in the preparation of agglomerated bodies presents further advantages from a practical commercial standpoint. Glauconite, such as in the form of greensand, may be used directly as mined, although occasionally fossils and other debris are removed before it is marketed. Due to its sandy consistency it is very easily handled in bulk. Moreover, since large amounts of water have no deleterious effect on it, it may be conveniently stored in the open in heaps until ready for use, and thus there are no handling or storage problems. The treatment of glauconite to develop its binding properties also presents no problem since mere mixing of it with the other ingredients in ordinary apparatus where rubbing or shearing forces are encountered is often all that is required, and no complicated chemical treatment or high temperature fusion operations need be resorted to.

SPECIFIC EXAMPLES

The following examples are included to illustrate the preparation of the novel products of the present invention and are not intended to limit the scope of the invention in any way.

Example I

Briquets are prepared which are adapted for supplying raw materials to the cupola in the manufacture of mineral wool by mixing together 450 lbs. of greensand, 750 lbs. of mineral wool shot, and 300 lbs. of silica sand (bar sand) in a pan mill. Between 5% and 10% of free moisture is present in the mixture.

The materials are mulled in the pan mill until between 10 and 15 horsepower hours of energy are expended per ton of material. As the working proceeds, the visible character of the mass changes from a loose, flowing mixture, to a caking, densified mass. The mixture is then conveyed to a briquetting press where briquets are formed. The briquets thus formed are strong and dense and can be dropped upon a wooden plank from the height of 6 feet without breaking. The briquets without further treatment may be stored or charged immediately to the cupola.

Example II

An agglomerated body adapted to be converted into a ceramic brick by vitrification, is prepared by mixing 1600 parts (by weight) of fly ash and 400 parts of glauconite in a muller for 5 minutes. The resulting mixture is mixed with 2000 parts of coal-ash slag in a standard brick pug mill. Water in an amount of 14% is added to provide a moldable mixture. The mix is extruded in a standard de-airing brick machine and the extruded product is cut into brick-like shapes. The agglomerated product is a strong easily handled body.

Example III

An agglomerated body, in the form of a briquet, adapted for charging iron ore to an iron melting furnace, is prepared by mixing 1000 parts of the iron oxide residue from processing of pyrites, with 200 parts of glauconite which has been ball-milled to provide a glauconite 60% of which has a particle size no greater than 100 microns. The mixing takes place in a pug mill in the presence of 150 parts of water. The moldable mixture thus formed is formed into briquets in a briquetting press. The resulting briquets are hard and dense and will withstand a 6 foot drop to a hard surface without breaking.

Considerable modification is possible in the selection of materials that may be present in the agglomerates of the present invention as well as the proportions thereof without departing from the scope of the present invention.

I claim:

1. An agglomerated body of high strength comprising in intimate admixture, solid particles of material selected from the group consisting of solid carbonaceous and solid inorganic substances bound in a matrix comprising glauconite, having a particle size no greater than 100 microns in an amount between 3% and 70%.

2. An agglomerated body of high strength comprising in intimate admixture, solid particles of material selected from the group consisting of solid carbonaceous and solid inorganic substances coated with glauconite, having a particle size no greater than 100 microns in an amount between 3% and 70%.

3. An agglomerated body of high strength adapted to be converted into a ceramic article by vitrification comprising in intimate admixture, particles of fly ash and coal-ash slag bound in a continuous matrix comprising glauconite, having a particle size no greater than 100 microns in an amount between 3% and 70%, and said coal-ash slag being present in an amount between 5% and 80% based on the combined weight of said fly ash and coal-ash slag.

4. The product of claim 3 wherein the coal-ash slag is present in an amount between 35% and 65% based on the combined weight of said fly ash and coal-ash slag, and wherein said glauconite is present in an amount between 5% and 15%.

5. A hard, dense agglomerated body adapted for addition to the cupola in the manufacture of mineral wool, comprising in intimate admixture, non-cohesive, non-plastic particles of mineral wool-forming ingredients bound in a matrix comprising glauconite, having a particle size no greater than 100 microns in an amount between 3% and 70%.

6. A hard, dense agglomerated body adapted for addition to the cupola in the manufacture of mineral wool comprising, in intimate admixture, non-cohesive, non-plastic particles of mineral wool-forming ingredients coated with glauconite, having a particle size no greater than 100 microns in an amount between 3% and 70%.

7. A hard, dense agglomerated body adapted for addition to the cupola in the manufacture of mineral wool comprising in intimate admixture, particles of silica sand and mineral wool shot bound in a matrix comprising glauconite, said silica sand being present in an amount between 15% and 25%, said mineral wool shot being present in an amount between 45% and 65%, and glauconite being present in an amount between 15% and 35%, between 45% and 100% of which has a particle size no greater than 100 microns.

8. A hard, dense agglomerated body available for addition as the sole mineral wool-forming charge to the cupola in the manufacture of mineral wool comprising, in intimate admixture, non-cohesive, non-plastic particles of mineral wool-forming ingredients bound in a matrix comprising glauconite having a particle size no greater than 100 microns in an amount between 3% and 70%, said mineral wool-forming ingredients and glauconite being present in amounts to provide a chemical analysis as follows: $SiO_2$ 30–50%, $Al_2O_3$ trace to 20%, iron oxide trace–35%, CaO 10–45%, and MgO trace–25%.

9. The product of claim 8 wherein the glauconite is present in an amount between 8% and 50%.

10. The method of making agglomerated bodies of high strength which comprises smearing solid particles of material selected from the group consisting of solid carbonaceous and solid inorganic substances with glauconite having a particle size no greater than 100 microns in an amount between 3% and 70%, and forming the resulting plastic mass into agglomerated bodies by consolidation.

11. The method of claim 10 wherein the agglomerated bodies are formed under pressure.

CHARLES RAYMOND BROWN.

REFERENCES CITED

The following references are of record in the file of this patent:

UNITED STATES PATENTS

| Number | Name | Date |
| --- | --- | --- |
| 372,486 | Parrott | Nov. 1, 1887 |
| 2,051,279 | Thorndyke | Aug. 18, 1936 |
| 2,265,540 | Nichols | Dec. 9, 1941 |
| 2,247,120 | Fitzgerald | June 24, 1941 |
| 2,478,151 | Bair | Aug. 2, 1949 |

FOREIGN PATENTS

| Number | Country | Date |
| --- | --- | --- |
| 792,947 | France | 1935 |
| 362,631 | Germany | 1922 |
| 215,397 | Switzerland | 1941 |
| 125,908 | Switzerland | 1928 |

OTHER REFERENCES

J. R. Thoenen: Mineral Wool, pp. 19, 22, 23, 40 and 41, Information Circular 6984R, June 1939, Bureau of Mines, U. S. Dept. of Interior.